UNITED STATES PATENT OFFICE.

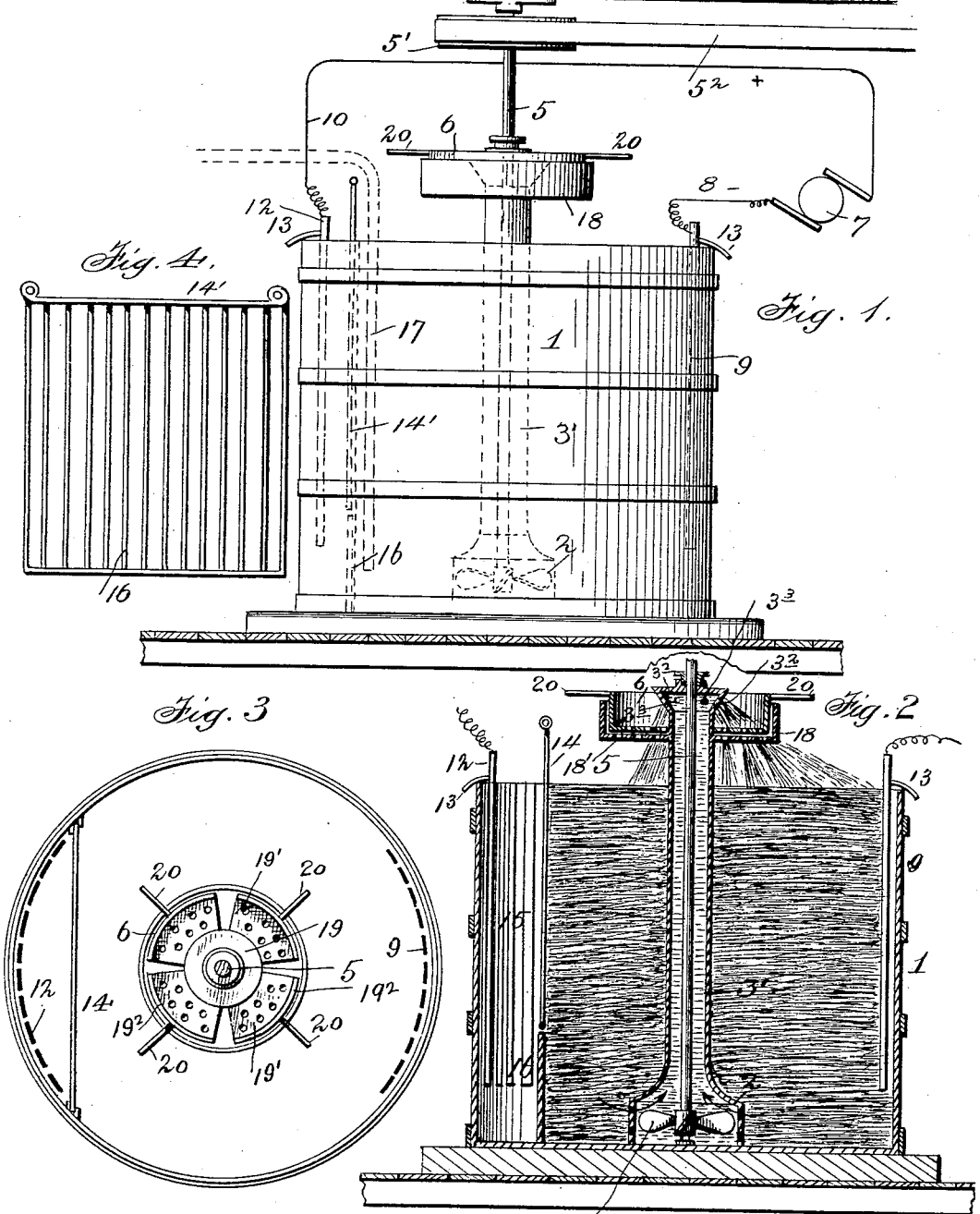

GOLDSBURY HARDEN POND, OF ASHBURNHAM, MASSACHUSETTS.

PROCESS OF AND APPARATUS FOR ELECTROCHEMICAL TREATMENT OF STRAW OR OTHER FIBROUS MATERIALS.

SPECIFICATION forming part of Letters Patent No. 588,084, dated August 10, 1897.

Application filed September 15, 1896. Serial No. 605,915. (No model.)

*To all whom it may concern:*

Be it known that I, GOLDSBURY HARDEN POND, a citizen of the United States, residing at Ashburnham, in the county of Worcester and State of Massachusetts, have invented certain new and useful Improvements in Processes of and Apparatus for the Electrochemical Treatment of Straw or other Fibrous Materials; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in the process of and apparatus for treating straw or other fibrous material by electrolytic action for the purpose of removing the silica and other incrustations therefrom preparatory to manufacturing the straw into pulp.

The invention consists in the novel process and in the novel construction and combination of parts hereinafter fully described and claimed.

In the accompanying drawings, Figure 1 is a side elevation of an apparatus for treating fibrous material constructed in accordance with my invention. Fig. 2 is a central longitudinal section of the same. Fig. 3 is a plan view. Fig. 4 is an elevation of the grating removed from the vat.

In the said drawings the reference-numeral 1 designates an open vessel or tank of any suitable dimensions, provided at one side with a vertical partition, hereinafter described. Located centrally on the bottom of said tank is a perforated cylindrical casing 2, provided with a vertical pipe 3', extending up above the top of the vat. Located within this pipe is a shaft 5, provided with a screw 3 at its lower end and with a pulley 5' at its upper end, driven by a belt 5² from any suitable motor. The upper end of the pipe 3' is closed by a conically-shaped cap or head 3², provided with inclined apertures or perforations 3³. Secured to said pipe below the cap is a cylindrical receptacle 18, provided with perforations 18' in its bottom, and located in this receptacle is a rotatable regulating device comprising a hub 19, encircling said pipe, provided with a number of radial perforated wings 19', provided with upwardly-extending curved sides 19², having radial handles 20 for rotating the same.

The reference-numeral 7 designates a dynamo or other source of electric energy, and 8 the negative conductor thereof, which is connected with a number of electrodes 9 in the tank. The positive pole of the battery is connected by conductor 10 with a number of carbon electrodes 12 at the opposite side of the tank. These electrodes, which may be of any ordinary or suitable construction, are supported and held by means of hooks 13, which engage with the upper edge of the vat.

The vertical solid partition 16, before referred to, extends about one-fourth way up the tank, and seated on its upper edge is a removable grating 14, consisting of a number of parallel vertical bars connected together at their ends by horizontal bars 14'. Against this grating the straw or other material is packed solidly and when the charge of straw is completed is removed.

The numeral 17 designates an adjustable steam-pipe extending down into the tank for heating the electrolyte.

The operation is as follows: A suitable quantity of electrolyte, the solution of chlorid of sodium and water, is placed in the tank and the straw or other fibrous material to be treated packed therein and banked against the partition and grating. The grating is then removed, the space between the said bank of material and the side of the tank where the positive electrodes are located forming a cell to receive the chlorin during electrolysis. Steam is then introduced into the tank to raise the solution to the boiling-point, the electric current turned on, and the shaft 5 rotated. Electrolysis will now take place, the solution being decomposed and most of the chlorin being prevented from entering the mass of straw owing to the bank of straw or other material and the solid partition on the bottom of the tank. The soda will form at the negative electrodes and the solution, being drawn into the casing by the screw and forced up through the pipe, will be forced out through the perforations in the cap into the perforated receptacle below, from whence it will escape to the tank in any direction required, being shut off from the anode side of the tank by the movable bottom acting as stop-valves. By this means an adjusted constant or varied circulation of the solution will be maintained in the tank and the sodium hydrate formed by the decomposition of the solution will be caused to permeate the mass of straw, so as to combine with the silica and other incrustations and remove the same.

In carrying out the above process it has been found important that the circulation of the solution in the tank at first should be very brisk and then should be slowed up. Therefore I provide the regulating device at the upper end of the pipe.

At the commencement of the operation the perforated wings 19' are turned so that the perforations in the same will register or coincide with the perforations in the receptacle 18, allowing the solution forced upward by the screw to escape freely back into the vat. The regulator is then turned so that the perforations therein and in the receptacle will be closed more or less, checking the flow of the solution.

Of course as the perforations are thus partially closed the speed of the screw is correspondingly decreased, so as to lessen the quantity of electrolyte supplied to the receptacle.

By the above operation the electrolyte will be distributed throughout the mass of straw while the banked and packed straw and the solid partition forming one side of the cell will prevent the entrance of nearly all the chlorin formed at the anodes.

I claim—

1. The method herein described of treating straw by the electrochemical decomposition of a solution of chlorid of sodium, which consists in packing or banking the straw in a tank containing a solution of chlorid of sodium in such manner that an open cell or space is formed between the anode and the mass of straw, and then causing the solution to be circulated in the vat and subjected to the action of an electric current.

2. In the electrochemical treatment of straw or other fibrous material by the decomposition of a solution of chlorid of sodium, the process herein described which consists in causing the solution undergoing decomposition to be circulated quickly throughout the mass of straw at the beginning of the operation and then decreasing the speed of the circulation, substantially as specified.

3. The process herein described of treating straw by electrolysis which consists in packing the straw in a suitable tank and forming an open anode-cell at the side thereof, then placing in said tank a solution of chlorid of sodium and maintaining a circulation of the same throughout the mass of straw, while passing a current of electricity through the solution, substantially as specified.

4. The combination with a tank for the treatment of straw by the electrochemical decomposition of a solution of chlorid of sodium, of the solid partition located in said tank and resting on the bottom thereof and the removable grating seated on said partition, substantially as described.

5. The combination with the tank and the electrodes, of the pipe located in the tank, the perforated receptacle at the upper end thereof, the perforated rotatable regulator and means for forcing a fluid contained in said tank up through said pipe and regulator and thus maintain a constant or variable circulation, substantially as described.

6. The combination with the tank, the electrodes, the vertical partition and grating at one side of the tank forming a cell in which the positive electrodes are located, of the perforated casing, the perforated receptacle, the adjustable perforated regulator, the rotatable shaft and the screw at the lower end thereof, substantially as described.

In testimony whereof I affix my signature in presence of two witnesses.

GOLDSBURY HARDEN POND.

Witnesses:
    JOS. L. COOMBS,
    WM. H. DE LACY.